United States Patent
Motta et al.

(10) Patent No.: US 10,262,452 B2
(45) Date of Patent: Apr. 16, 2019

(54) 3D LIGHTING

(71) Applicant: Apple Inc., Cupertino, CA (US)

(72) Inventors: Ricardo Motta, Palo Alto, CA (US);
Lynn R. Youngs, Cupertino, CA (US);
Minwoong Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 15/274,284

(22) Filed: Sep. 23, 2016

(65) Prior Publication Data

US 2017/0091988 A1    Mar. 30, 2017

Related U.S. Application Data

(60) Provisional application No. 62/235,570, filed on Sep. 30, 2015.

(51) Int. Cl.
| | |
|---|---|
| *G06T 15/60* | (2006.01) |
| *G06T 15/50* | (2011.01) |
| *G06F 3/0346* | (2013.01) |
| *G06K 9/00* | (2006.01) |
| *G06T 15/20* | (2011.01) |

(52) U.S. Cl.
CPC .......... *G06T 15/506* (2013.01); *G06F 3/0346* (2013.01); *G06K 9/00228* (2013.01); *G06T 15/20* (2013.01); *G06T 15/205* (2013.01); *G06T 15/50* (2013.01); *G06T 15/60* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 6,891,527 B1 * | 5/2005 | Chapman | G06F 3/0346 345/158 |
| 8,416,236 B1 | 4/2013 | Hickman | |
| 8,547,457 B2 * | 10/2013 | Wolfe | G03B 15/03 348/255 |
| 2010/0079449 A1 | 4/2010 | McCarthy | |
| 2010/0103172 A1 | 4/2010 | Purdy | |

(Continued)

FOREIGN PATENT DOCUMENTS

| | | |
|---|---|---|
| WO | 2014006514 A2 | 1/2014 |
| WO | 2014190221 A1 | 11/2014 |

OTHER PUBLICATIONS

International Search Report and Written Opinion received in PCT Patent Application No. PCT/US2016/053461, dated Jan. 12, 2017.

*Primary Examiner* — Said Broome

(74) *Attorney, Agent, or Firm* — Blank Rome LLP

(57) ABSTRACT

Techniques are disclosed for displaying a graphical element in a manner that simulates three-dimensional (3D) visibility (including parallax and shadowing). More particularly, a number of images, each captured with a known spatial relationship to a target 3D object, may be used to construct a lighting model of the target object. In one embodiment, for example, polynomial texture maps (PTM) using spherical or hemispherical harmonics may be used to do this. Using PTM techniques a relatively small number of basis images may be identified. When the target object is to be displayed, orientation information may be used to generate a combination of the basis images so as to simulate the 3D presentation of the target object.

22 Claims, 5 Drawing Sheets

(56) References Cited

U.S. PATENT DOCUMENTS

| | | |
|---|---|---|
| 2010/0156907 A1 | 6/2010 | VanderSpek |
| 2010/0189342 A1 | 7/2010 | Parr |
| 2011/0285822 A1* | 11/2011 | Dai .................. G06T 7/0073 348/46 |
| 2013/0015946 A1 | 1/2013 | Lau |
| 2013/0016102 A1* | 1/2013 | Look .................. G06T 15/20 345/426 |
| 2013/0147798 A1* | 6/2013 | Karsch ................ G06T 19/006 345/420 |
| 2014/0300773 A1* | 10/2014 | Voronov ............. H04N 5/2353 348/229.1 |

* cited by examiner

3D LIGHTING

BACKGROUND

The realistic display of three-dimensional (3D) objects on a two-dimensional (2D) surface has been a long-time goal in the image processing field. One approach to simulating a 3D object is to take a large number of images each illuminated from a different position. A specific image may then be selected and displayed based on a detected location of a light source (e.g., through an ambient or color light sensor). Another approach is to take a large number of images each with the 3D object in a different location relative to a fixed light source. Again, a specific image may be selected and displayed based on a determined orientation of the 3D object (e.g., through use of an accelerometer). Another method would be to combine these two prior approaches so that both lighting location and object orientation may be accounted for. It should be relatively easy to grasp that the number of images needed for either of the first two approaches can become very large—making it difficult to implement in low-memory devices.

SUMMARY

In one embodiment the disclosed concepts provide a method to display three dimensional (3D) representations of an object based on orientation information. The method includes displaying a first image of the object on a display unit of an electronic device, wherein the first image is indicative of a first 3D presentation of the object; determining (based on output from one or more sensors integral to the electronic device), orientation information of the electronic device; determining a second image to display based on a light model of the object and the orientation information; adding synthetic shadows, based on the orientation information, to the second image to generate a third image; and displaying the third image of the object on the display unit, wherein the third image is indicative of a second 3D presentation of the object—the second 3D presentation being different from the first 3D presentation.

In one embodiment, orientation information may be determined relative to a gravity field using, for example, an accelerometer or a gyroscope. In another embodiment, orientation information may be based on a direction of light. In still another embodiment, an image may be captured coincident in time with display of the first image (an in a direction of light emitted from the display unit). The image may then be analyzed to identify certain types of objects and, from there, an orientation of the electronic device may be determined. By way of example, if the captured image includes a face, then the angle of the face within the captured frame may provide some orientation information. Various types of light models may be used. In one embodiment, the light model may be a polynomial texture map (PTM) model. In general, the model may encode or predict the angle of light and therefore the presentation of the object based on the orientation information. In addition to synthetic shadows, parallax information may be incorporated into the model or added like the synthetic shadows. A computer executable program to implement the disclosed methods may be stored in any media that is readable and executable by a computer system.

DETAILED DESCRIPTION

This disclosure pertains to systems, methods, and computer readable media to display a graphical element exhibiting three-dimensional (3D) behavior. In general, techniques are disclosed for displaying a graphical element in a manner that simulates full 3D visibility (including parallax and shadowing). More particularly, a number of images, each captured with a known spatial relationship to a target object, may be used to construct a lighting model of the target object. In one embodiment, for example, polynomial texture maps (PTM) using spherical or hemispherical harmonics may be used to do this. Using PTM techniques a relatively small number of basis images may be identified. When the target object is to be displayed, orientation information may be used to generate a combination of the basis images so as to simulate the 3D presentation of the target object—including, in some embodiments, the use of shadows and parallax artifacts. Orientation information may be obtained from, for example, from an accelerometer or a light sensor.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those of ordinary skill in the design and implementation of graphics processing systems having the benefit of this disclosure.

Figure 1:
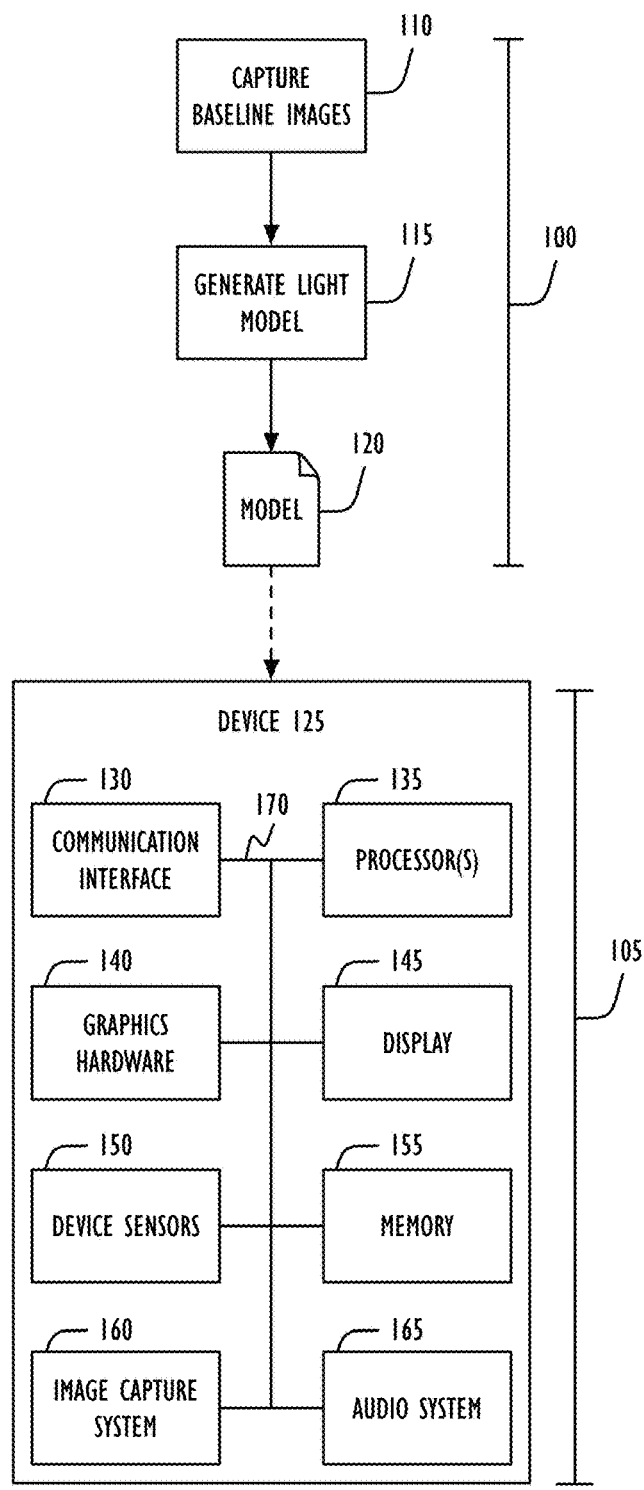
FIG. 1 illustrates a two-phase operation in accordance with one embodiment.

Referring to FIG. 1, techniques in accordance with this disclosure may be thought of as being made up of model development phase 100 and model deployment phase 105. Model development phase 100 may include the capture of baseline images (block 110) and the development of a model from those images (block 115). In one embodiment, model 120 may include multiple images of the target object captured at different viewing positions and/or lighting angles. In another embodiment, model 120 may include the development of a PTM model based on the captured baseline images. In still another embodiment, model 120 may include a combination of captured images and one or more PTM models. Once generated, model 120 may be deployed to electronic device 125. As shown, electronic device 125 in accordance with one embodiment may include communication interface 130, one or more processors 135, graphics hardware 140, display element or unit 145, device sensors 150, memory 155, image capture system 160, and audio system 165 all of which may be coupled via system bus or backplane 170 which may be comprised of one or more continuous (as shown) or discontinuous communication links.

Communication interface 130 may be used to connect electronic device 125 to one or more networks. Illustrative networks include, but are not limited to, a local network such as a USB or Bluetooth network, a cellular network, an organization's local area network, and a wide area network such as the Internet. Communication interface 130 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Processor(s) 135 may be a system-on-chip such as those found in mobile devices and include one or more dedicated graphics processing units (GPUs). Processor 135 may be based on reduced instruction-set computer (RISC) or complex instruction-set computer (CISC) architectures or any other suitable architecture and each processor may include one or more processing cores. Graphics hardware 140 may be special purpose computational hardware for processing graphics and/or assisting processor(s) 135 perform computational tasks. In one embodiment, graphics hardware 140 may include one or more programmable GPUs and each such unit may include one or more processing cores. Display 145 may use any type of display technology such as, for example, light emitting diode (LED) technology. Display 145 may provide a means of both input and output for device 125. Device sensors 150 may include, by way of example, 3D depth sensors, proximity sensors, ambient light sensors, accelerometers and/or gyroscopes. Memory 155 represents both volatile and non-volatile memory. Volatile memory may include one or more different types of media (typically solid-state) used by processor(s) 135 and graphics hardware 140. For example, memory 155 may include memory cache, read-only memory (ROM), and/or random access memory (RAM). Memory 155 may also include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 155 may be used to retain media (e.g., audio, image and video files), preference information, device profile information, computer program instructions or code organized into one or more modules and written in any desired computer programming language, and any other suitable data. When executed by processor(s) 135 and/or graphics hardware 140 such computer program code may implement one or more of the techniques or features described herein. Image capture system 160 may capture still and video images and include one or more image sensors and one or more lens assemblies. Output from image capture system 160 may be processed, at least in part, by video codec(s) and/or processor(s) 135 and/or graphics hardware 140, and/or a dedicated image processing unit incorporated within image capture system 160. Images so captured may be stored in memory 155. By way of example, electronic device 125 may have two major surfaces. A first or front surface may be coincident with display unit 145. A second or back surface may be an opposing surface. In some embodiments, image capture system 160 may include one or more cameras directed outward from the first surface and one or more cameras directed outward from the second surface. Electronic device 125 could be, for example, a mobile telephone, personal media device, portable camera, or a tablet, notebook or desktop computer system.

Figure 2A:
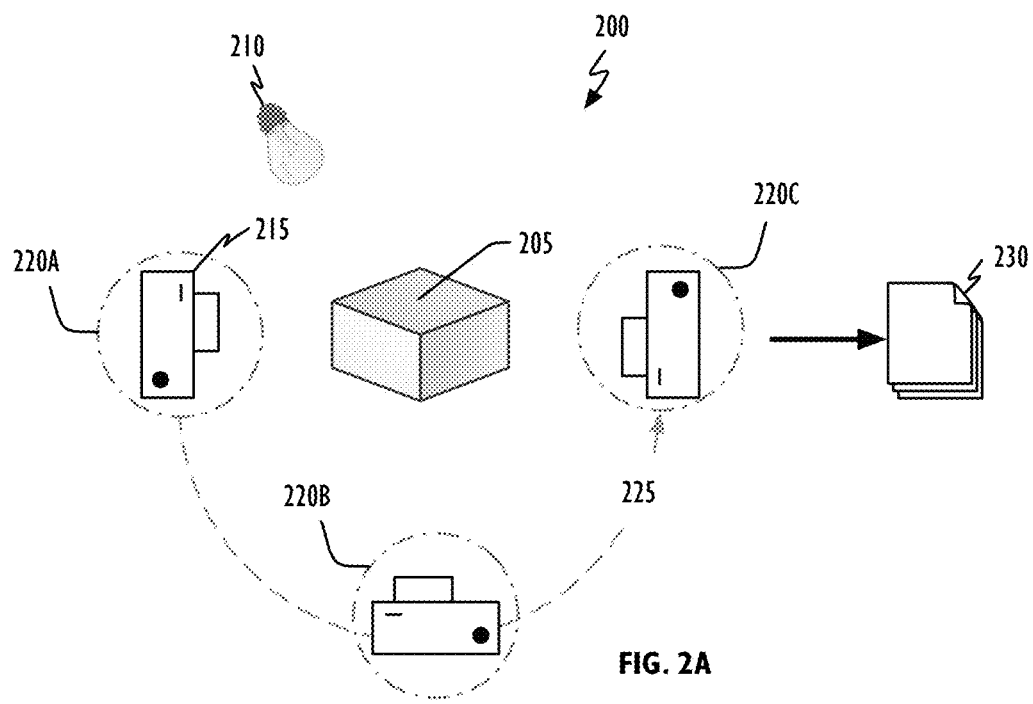
FIGS. 2A and 2B illustrate two baseline image capture operations in accordance with one embodiment.
Figure 2B:
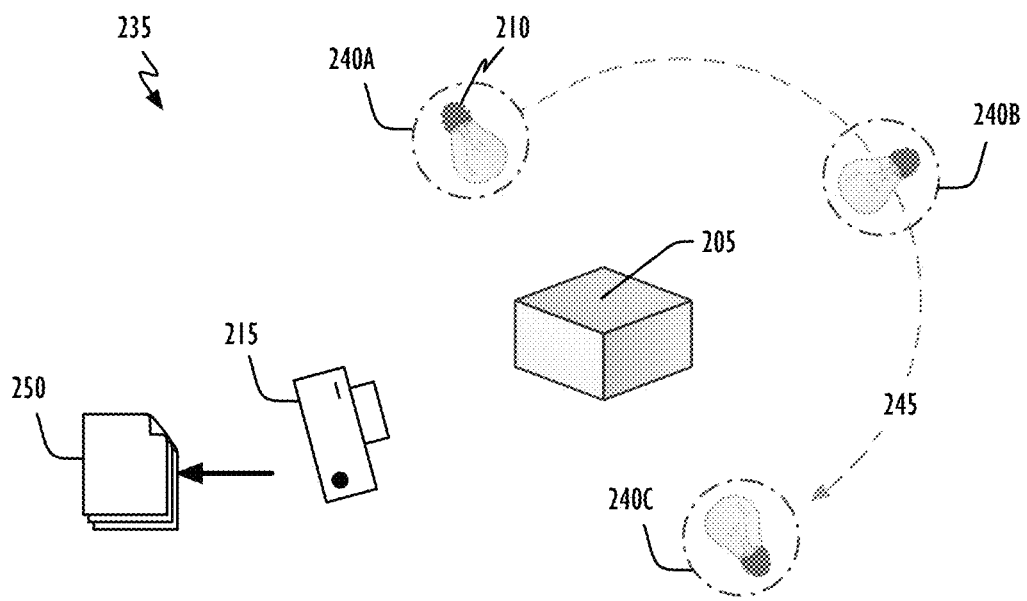

Baseline image capture in accordance with block 110 may include one or two phases. Referring to FIG. 2A, phase-1 200 may 3D include target object 205 that is illuminated from light source 210. As camera 215 moves from position 220A to position 220B to position 220C along path 225, a relatively large number of images may be obtained to produce phase-1 image corpus 230. By way of example, in moving from position 220A to position 220C, a total of 180 images may be captured (e.g., one image for every 1° of motion). In another embodiment camera 215 may be moved completely around target object 205. In this embodiment a total of 360 images may be captured (e.g., one image for every 1° of motion). Referring to FIG. 2B, optional phase-2 235 may include 3D target object 205 that is illuminated from light source 210 that moves from position 240A to position 240B to position 240C along path 245 while camera 215 remains in a single position taking a relatively large number of images (e.g., 150) to produce phase-2 image corpus 250. The precise number of images needed to generate image corpus 230 and image corpus 250 may be dependent on the desired fidelity of the resulting model—the more precise the model, generally the more images will be needed. In some embodiments, captured images 230 and 250 capture shadowing, highlights and parallax information.

Figure 3:
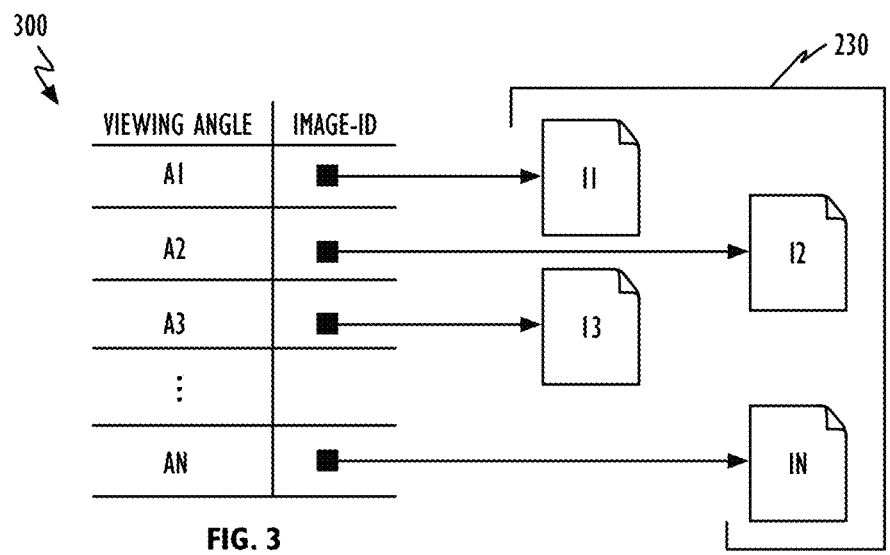
FIG. 3 shows a light model system in accordance with one embodiment.

Referring to FIG. 3, in one embodiment image corpus 230 may be organized so that each (or at least some) of the images are associated with their corresponding viewing angle as illustrated in table 300. In accordance with embodiments of this type, the mapping between viewing (capture) angle and target object 205 may be thought of as a model (e.g., model 120). During run-time (e.g., use of electronic device 125), sensor devices 150 may be used to determine a viewing angle. Once determined, the corresponding image may be retrieved from memory 155 and displayed using display element 145. In one embodiment, if the viewing angle determined from sensor output is between a viewing angle captured in accordance with FIG. 2A, the two images to either "side" of the sensor-provided viewing angle may be combined in, for example, a weighted sum. (As used here, the phrase "either side" means a captured image associated with a lower viewing angle most closely the same as the sensor indicated viewing angle and a captured image associated with a higher viewing angle most closely the same as the sensor indicated viewing angle.) One of ordinary skill in the art will recognize that image corpus 230 may be retained in structures different from a single table as shown in FIG. 3. For example, a plurality of tables such as in a relational database or a B-tree or other data structure useful for data comparison and retrieval operations.

Figure 4:
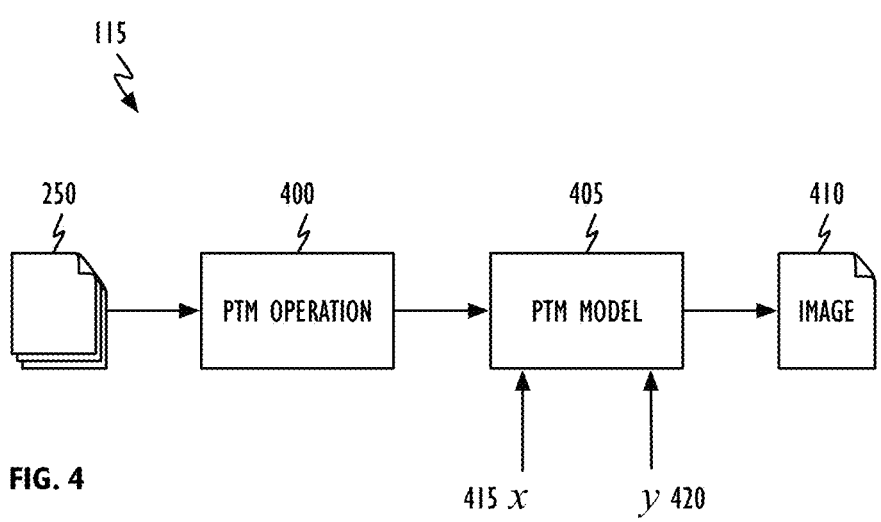
FIG. 4 shows a light model system in accordance with another embodiment.

Referring to FIG. 4, model generation in accordance with block 115 may apply PTM operation 400 to each image in image corpus 250 independently to produce PTM model 405. During run-time (e.g., use of electronic device 125), sensor devices 150 may be used to determine a lighting angle with respect to target object 205 (e.g., electronic device 125). Once determined, the corresponding position may be input to PTM model 405 (e.g., in terms of x-position 415 and y-position 420 and optionally a z-position, not shown) and used to generate output image 410. In another embodiment, light angle may be represented in other coordinate systems such as, for example, yaw-pitch-roll). In one embodiment, PTM operation 400 may employ spherical harmonics (SH). In another embodiment, PTM operation 400 may employ hemispherical harmonics (HSH). In still other embodiments, different basis functions may be used such as, for example, Zernike polynomials, spherical wavelets, and Makhotkin hemispherical harmonics. The precise functional relationship or polynomial chosen may be a function of the implementation's operational environment, the desired fidelity of the resulting light model, and the amount of memory needed by the model.

One feature of PTM operation 400, is that it produces model 405 that may use significantly fewer images than are in image corpus 250. Image corpus 250 may include a relatively large number of high resolution color images (e.g., 50-400 each). In contrast, PTM model 405 may need only a few "images" from which all images within that model's range may be generated. By way of example, in one embodiment PTM model 405 may employ spherical harmonics and result in a polynomial of the following form.

$$p_i = a_0 x^2 + a_1 y^2 + a_2 xy + a_3 x + a_4 y + a_5,  \quad \text{EQ. 1}$$

where '$p_i$' represents the model's output for pixel 'i' given an illuminate location (x, y), and $a_0$ through $a_5$ are model coefficients, the values of which are returned or found by PTM operation 400. In general, model coefficients $a_0$ through $a_5$ may be different for each pixel of image 410 represented by x input 415 and y input 420.

In practice, $p_i$ as defined by EQ. 1 represents only the intensity or luminance of the ith pixel in output image 410. To introduce color, a color matrix [C] may be introduced such that:

$$[P] = [C][P],  \quad \text{EQ. 2}$$

where [C] represents the color value associated with each pixel in output image [P] (e.g., output image 410). In one embodiment, each pixel value in [C] may be the average color value of all corresponding pixels in image corpus 250. In another embodiment, each pixel value in [C] may be the median value of all the corresponding pixels in image corpus 250. In yet another embodiment, the value of each pixel in chroma image [C] may be a weighted average of all corresponding color values in image corpus 250. In still another embodiment, chroma values from image corpus 250 may be combined in any manner deemed useful for a particular embodiment (e.g., non-linearly).

Figure 5:
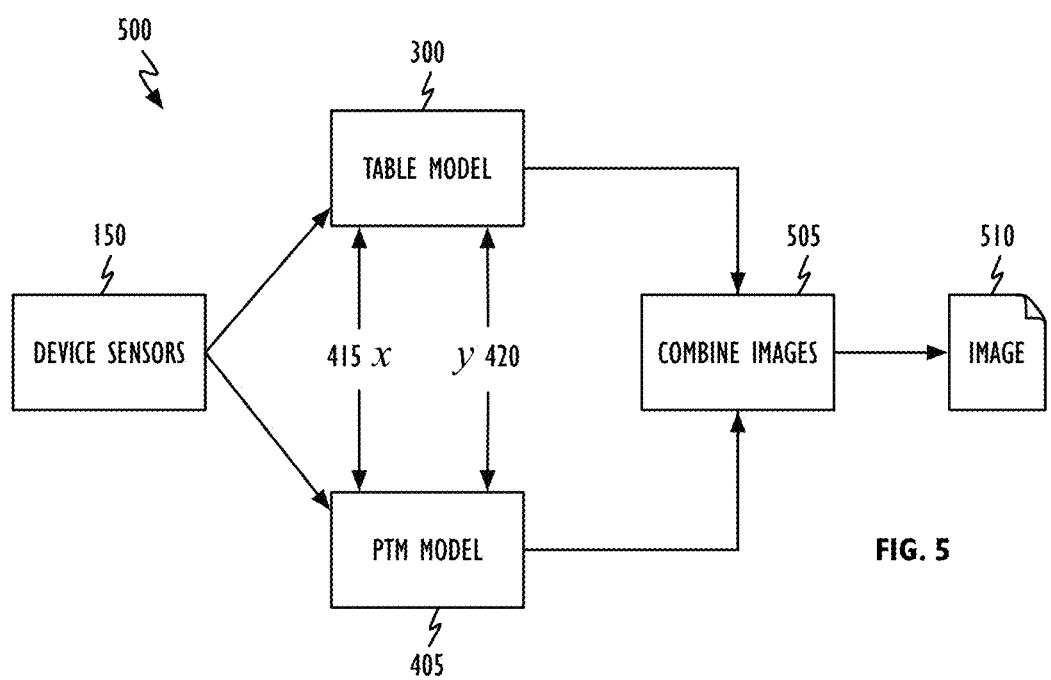
FIG. 5 shows a system in accordance with yet another embodiment.

Model deployment phase 105 in accordance with FIG. 1 may be invoked once at least one generated model (e.g., model 300 and/or model 405) are transferred to memory 155 of electronic device 125. Once installed onto device 125, target object 205 may be displayed on display unit 145. Referring to FIG. 5, system 500 in accordance with another embodiment may employ device sensors 150 to supply models 300 and 405 with input (e.g., 415 and 420). In one embodiment, device sensors 150 may include ambient and/or color sensors to identify both the location and temperature of a light source. In another embodiment, device sensors 150 include a gyroscope and/or an accelerometer so that the orientation of device 125 may be determined. If both models 300 and 405 are used, their respective output images may be combined 505 to generate output image 510. In one embodiment, combine operation 505 may be a simple merge operation. In another embodiment, combine operation 505 may represent a weighted combination of each model's output. In yet another embodiment, combine operation 505 may in fact select one model output based on sensor input and/or user input.

By way of another example consider, first the situation wherein model 405 is operative and device sensors 150 indicate device 125 is tilted at an orientation representative of a viewer looking down on target object 205 at an approximately 45° angle. If a person were holding an object in their hand looking straight down onto its top, they would expect to see the object's top surface. As they moved their head to a 45° angle, they would expect to see less of the object's top surface and more of one or more side surfaces. In practice, sensor input indicative of a 45° angle (represented as x and y coordinates, see FIG. 5) could be input to PTM model 405 and output image 510 would be a combination of the PTM coefficient images modified to provide color.

Images output in accordance with this disclosure may include shadows, highlights and parallax to the extent this information is captured in the generated image corpuses. In another embodiment, if shadow information is not included in the image data used to generate the model, tilt, and/or the identified direction of a light source (relative to device 125) may be used to generate synthetic shadows (e.g., based on image processing). Embodiments employing this technique may use sensor input to generate a first output image from the relevant light model (e.g., output image 410 or 510). This image may then be used to generate synthetic shadows. The synthetic shadows may then be applied to a first output image to generate a final output image which may be displayed, for example, on display unit 145. In still another embodiment, electronic device 125 may include a camera unit outwardly facing from display 145. The camera could then capture and analyze an image (separate from or in combination with device sensors 150) to determine the devices orientation and/or input to models 300 and 405. The resulting output image (e.g. image 510) may include shadows as captured during model generation or synthetically via image analysis. In one embodiment, the image captured may include a face such that aspects of the detected face (e.g., location of the eyes and/or mouth and/or nose) may be used to determine input to model 300 and/or 405.

Figure 6:
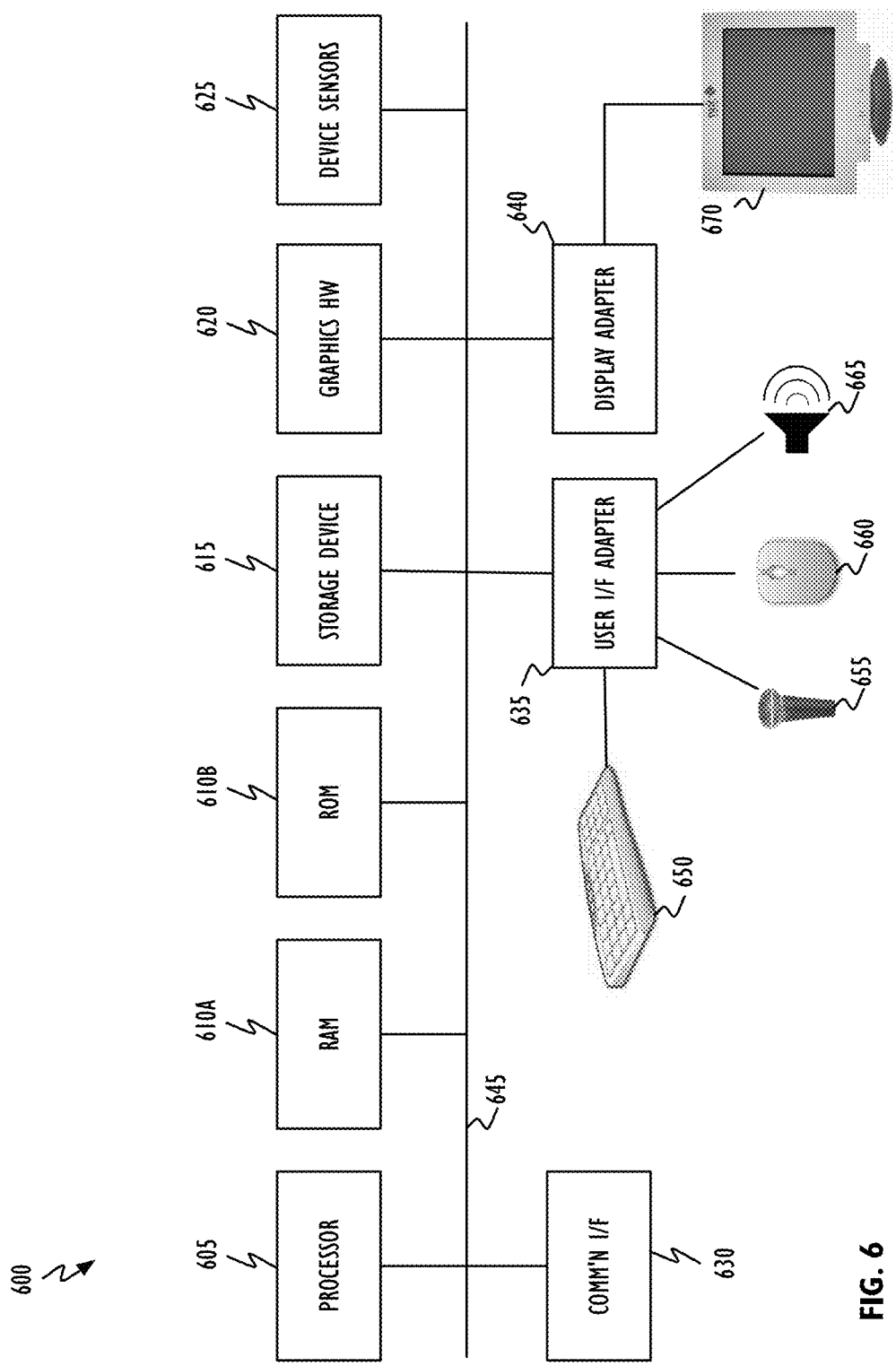
FIG. 6 shows a computer system in accordance with one embodiment.

Referring to FIG. 6, in addition to being deployed on electronic device 125 the disclosed techniques may be developed and deployed on representative computer system 600 (e.g., a general purpose computer system such as a desktop, laptop, notebook or tablet computer system). Computer system 600 may include one or more processors 605, memory 610 (610A and 610B), one or more storage devices 615, graphics hardware 620, device sensors 625 (e.g., 3D depth sensor, proximity sensor, ambient light sensor, color light sensor, accelerometer and/or gyroscope), communication interface 630, user interface adapter 635 and display adapter 640—all of which may be coupled via system bus or backplane 645. Processors 605 memory 610 (including storage devices 615), graphics hardware 620, device sensors 625, communication interface 630, and system bus or backplane 645 provide the same or similar function as similarly identified elements in FIG. 1 and will not, therefore, be described further. User interface adapter 635 may be used to connect keyboard 650, microphone 655, pointer device 660, speaker 665 and other user interface devices such as a touch-pad and/or a touch screen (not shown). Display adapter 640 may be used to connect one or more display units 670 (similar in function to display unit 145) which may provide touch input capability. System 600 may be used to both develop models in accordance with this disclosure (e.g., models 120, 300 and 405). The developed models may thereafter be deployed to computer system 600 or electronic device 125. (In another embodiment, electronic device 125 may provide sufficient computational power as to enable model development so that general computer system 600 need not be used.)

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, the deployment of models 120, 300 and 405 may be developed separately or together. In yet another embodiment, image corpuses 230 and 250 may be combined and used to generate a single light model. In one or more embodiments, one or more of the disclosed steps may be omitted, repeated, and/or performed in a different order than that described herein. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An electronic device, comprising:
   memory;
   a display unit coupled to the memory;
   one or more sensor elements;
   one or more processors coupled to the memory, the display unit, the one or more sensor elements, the one or more processors configured to execute program instructions stored in the memory to cause the electronic device to—
   display a first image of an object on the display unit, the first image indicative of a first three-dimensional presentation of the object at a first orientation,
   determine, based on output from the one or more sensors, orientation information of the electronic device corresponding to a second orientation,
   determine a second image of the object based on a light model of the object and the orientation information, wherein the light model of the object comprises a plurality of images of the object at different viewing angles,
   add synthetic shadows, based on the orientation information, to the second image of the object to generate a third image of the object, and
   display the third image of the object on the display unit, wherein the third image is indicative of a second three-dimensional presentation of the object.

2. The electronic device of claim 1, wherein the orientation information comprises an orientation of the electronic device relative to a gravity field.

3. The electronic device of claim 1, wherein the orientation information comprises an orientation of the electronic device relative to a light source.

4. The electronic device of claim 1, further comprising an image capture unit configured to capture a scene from a same direction as light emitted by the display unit.

5. The electronic device of claim 4, further comprising program instructions stored in the memory to cause the electronic device to:
   capture an image with the image capture unit coincident with display of the first image of the object; and
   determine the orientation information of the electronic device based on analysis of the captured image.

6. The electronic device of claim 5, wherein analysis of the captured image includes face detection.

7. The electronic device of claim 1, wherein the light model of the object comprises a polynomial texture map (PTM) model.

8. The electronic device of claim 1, wherein the light model of the object includes parallax information.

9. A non-transitory program storage device comprising instructions stored thereon to cause one or more processors to:
   obtain a first image of an object from a memory;
   display the first image of the object on a display unit, the first image indicative of a first three-dimensional presentation of the object at a first orientation;
   determine, based on output from one or more sensors, orientation information of an electronic device corresponding to a second orientation, wherein the electronic device includes the memory and the display unit;
   determine a second image of the object based on a light model of the object and the orientation information, wherein the light model of the object comprises a plurality of images of the object at different viewing angles;
   add synthetic shadows, based on the orientation information, to the second image of the object to generate a third image of the object; and
   display the third image of the object on the display unit, wherein the third image is indicative of a second three-dimensional presentation of the object.

10. The non-transitory program storage device of claim 9, wherein the instructions to cause the one or more processors to determine orientation information comprise instructions to cause the one or more processors to determine the orientation information based on a gravity field.

11. The non-transitory program storage device of claim 9, wherein the instructions to cause the one or more processors to determine orientation information comprise instructions to cause the one or more processors to determine the orientation information based on detection of a light source.

12. The non-transitory program storage device of claim 9, further comprising instructions to cause the one or more processors to:
   capture, with an image capture unit, a scene from a same direction as light emitted by the display unit, wherein the capture occurs at a time coincident with display of the first image; and
   determine the orientation information based on analysis of the captured image.

13. The non-transitory program storage device of claim 12, wherein the instructions to cause the one or more processors to determine the orientation information based on analysis of the captured image comprise instructions to cause the one or more processors to detect a face in the captured image.

14. The non-transitory program storage device of claim 12, wherein the light model of the object comprises a polynomial texture map (PTM) model.

15. The non-transitory program storage device of claim 9, wherein the light model of the object includes parallax information.

16. A method to display a three-dimensional representation of an object, comprising:
  displaying a first image of an object on a display unit of an electronic device, the first image indicative of a first three-dimensional presentation of the object at a first orientation;
  determining, based on output from one or more sensors of the electronic device, orientation information of the electronic device corresponding to a second orientation;
  determining a second image of the object based on a light model of the object and the orientation information, wherein the light model of the object comprises a plurality of images of the object at different viewing angles;
  adding synthetic shadows, based on the orientation information, to the second image of the object to generate a third image of the object; and
  displaying the third image of the object on the display unit, wherein the third image is indicative of a second three-dimensional presentation of the object.

17. The method of claim 16, wherein the orientation information comprises an orientation of the electronic device relative to a gravity field.

18. The method of claim 16, wherein the orientation information comprises an orientation of the electronic device relative to a light source.

19. The method of claim 16, further comprising:
  capturing an image with an image capture unit of the electronic device coincident in time with displaying the first image, wherein the image capture unit is configured to capture image in a direction outward from the display unit; and
  determining the orientation information based on analysis of the captured image.

20. The method of claim 19, wherein analysis of the captured image includes detecting a face in the captured image.

21. The method of claim 16, wherein the light model of the object comprises a polynomial texture map (PTM) model.

22. The method of claim 16, wherein the light model of the object includes parallax information.

* * * * *